United States Patent [19]

Ludwigson

[11] Patent Number: 4,923,527
[45] Date of Patent: May 8, 1990

[54] APPARATUS AND METHOD FOR SLAG-FREE CUTTING OF BILLETS AND THE LIKE

[75] Inventor: Robert G. Ludwigson, Brookfield, Wis.

[73] Assignee: Messer Griesheim Industries, Inc., Valley Forge, Pa.

[21] Appl. No.: 323,620

[22] Filed: Mar. 14, 1989

[51] Int. Cl.⁵ .............................. B23K 7/02
[52] U.S. Cl. .................... 148/9 R; 266/48; 266/50
[58] Field of Search ............... 148/9 R, 9.5; 266/48, 266/49, 50, 51

[56] References Cited

U.S. PATENT DOCUMENTS

| | | | |
|---|---|---|---|
| 2,266,552 | 12/1941 | Jones | 266/49 |
| 2,289,786 | 7/1942 | Jones | 266/49 |
| 3,163,559 | 12/1954 | Thompson et al. | 266/49 |
| 3,953,005 | 4/1976 | Rokop et al. | 266/50 |
| 4,336,078 | 6/1982 | Radtke | 266/49 |
| 4,405,382 | 9/1983 | Baier et al. | 266/49 |

FOREIGN PATENT DOCUMENTS 0235588 9/1987 European Pat. Off.
0121589 10/1987 European Pat. Off.
2925419 1/1981 Fed. Rep. of Germany.

Primary Examiner—S. Kastler
Attorney, Agent, or Firm—Andrus, Sceales, Starke & Sawall

[57] ABSTRACT

A billet cutting apparatus of the type including an oxy-fuel cutting torch includes a slag removal nozzle operative simultaneously with the cutting torch to direct a jet of oxygen along the lower edge of the billet to remove slag beads tending to form thereon. The oxygen nozzle has a unique opening configuration which provides a thin, flat oxygen stream effective over a substantial distance, such that the nozzle can be mounted laterally of the billet and outside the hostile and potentially damaging environment created by the cutting torch and the hot billet. The nozzle may be conveniently mounted in a fixed position and, in an automated billet cutting apparatus, may be attached directly to one of the billet clamping arms.

10 Claims, 2 Drawing Sheets

APPARATUS AND METHOD FOR SLAG-FREE CUTTING OF BILLETS AND THE LIKE

BACKGROUND OF THE INVENTION

The present invention relates to the cutting of steel billets into selected lengths from a continuous cast strand or the like and, more particularly, to an apparatus and method for eliminating the formation of slag on cuts made with an oxy-fuel torch. Oxy-fuel cutting torch systems are well known and commonly used to cut billets and other steel sections into selected lengths. For example, in a continuous casting operation, a continuous cast strand is cut into billets lengths as the strand exits the caster. A cutting torch is mounted to move with the cast steel strand and to make a lateral separating cut through the strand perpendicular to its longitudinal axis and direction of movement. In one conventional cutting torch mounting assembly, the torch is attached to a carriage which may be clamped directly to the billet to move therewith such that the cutting torch and the cutting jet depending downwardly from the torch may be moved across and cut the billet while the continuous cast strand moves longitudinally from the casting machine.

As the oxy-fuel cutting jet cuts through the billet, a slit or kerf is formed and molten steel and iron oxide flows downwardly between the faces of the metal defining the kerf under the influence of gravity and the force of the cutting jet. Much of the molten material drops below the billet for collection and disposal, but some of the molten material adheres to and forms a slag bead along the lower edges of the kerf. If the slag accumulation is not immediately removed or prevented from forming, it will eventually harden and have to be removed in a secondary operation. The slag must be removed otherwise it will adversely affect subsequent forming operations performed on the billet and may result in defects in the final steel product. Secondary operations, such as scarfing, are tedious, time consuming and costly and, in addition, the removal of slag once it has substantially hardened may also result in the removal of base material. Slag formation may be minimized with slow speed cutting, but slow cutting speeds are incompatible with the more rapid and efficient continuous casting processes requiring faster billet cutting speeds.

Thus, there has been a need and desire in the industry for a method and apparatus which will eliminate or preclude the formation of slag on the lower edges of the kerf in billets and similar shapes cut at higher speeds with an oxy-fuel cutting torch. The method and apparatus must be simple and effective, yet operate in the extremely hostile environment typically encountered.

The prior art is repleat with attempts to prevent slag formation on the lower edges of the kerf formed in a flame cut billet or other shape. In general, it has been discovered and is well known that directing a fluid stream at the molten slag as it forms on the edges of the kerf will tend to blow it away and thereby preclude its adherence. The fluid stream may comprise air, oxygen, water, mixtures thereof, or other gases or liquids. In U.S. Pat. No. 2,289,786, a narrow stream or jet of oxygen is directed at the lower edge of the leading face of the kerf formed by a gas cutting nozzle. The nozzle providing the oxygen stream is supported on a mechanism which causes the nozzle to closely follow the advancing face of the kerf as the billet is cut and to direct the stream of oxygen at the point of emergence of the slag from the kerf. However, the moving nozzle support apparatus is in direct contact with the hot billet and the oxygen nozzle is disposed directly beneath the cutting torch jet as the nozzle traverses the underside of the billet. Although the apparatus is described as being capable of oxidizing and blowing the slag away from the base metal, it is also known that the extremely hostile environment makes the apparatus totally impractical from the standpoint of effective and useful life.

U.S. Pat. No. 2,266,552 shows the use of an oxygen nozzle or combination of nozzles for directing a low velocity oxygen stream at the slag bead in a secondary operation after the billet has been cut by hot-sawing. The low velocity oxygen stream is intended to completely oxidize and burn off the slag from the sawed body. As disclosed, the oxygen streams are disposed closely adjacent the slag beads and, in one embodiment, to travel with, but disposed against the teeth of, the advancing saw blade. The narrowly concentrated low velocity stream requires the nozzle to be positioned closely adjacent the slag bead and, as indicated, is either provided as a secondary operation or must be disposed directly in the hostile and potentially damaging environment when performed concurrently with the sawing operation.

U.S. Pat. No. 4,336,078 shows a slag removal oxygen nozzle which is adapted to be mounted for travel with the gas cutting nozzle as the latter travels above and cuts through an ingot, slab or the like. As in the patents previously described, the slag removing oxygen jets provide narrow, small diameter streams of oxygen which are oriented to impinge directly on the lower edge of the kerf immediately adjacent the advancing edge thereof as the cut progresses. In particular, the oxygen jet supporting apparatus is adapted to move within and through the kerf as it is formed. Again, as with the previous art described, the effectiveness of the slag removal provided by this apparatus requires its orientation and movement within the extremely hostile environment where it is not likely to last for any practically adequate period of time. In addition, advances in cutting torch technology have provided the ability to make cuts with much narrower kerfs, and the carrying apparatus disclosed in this patent is much too wide to practically fit within narrow kerfs formed with today's technology.

U.S. Pat. No. 4,405,382 describes a method and apparatus for removing a slag bead in a secondary operation. A stream of oxygen is directed against the cut surface (i.e. perpendicular to the direction of the cut) immediately above the lower edge of the kerf under which slag bead forms. The narrow and highly directed oxygen jet is disposed closely adjacent the surface of the cut and provides a so-called "scarfing" action which usually results in the removal of base material as well.

Published German patent application (Offenlegungsschrift) 29 25 419, dated Jan. 8, 1981, shows a similar apparatus in which a pair of oxygen nozzles are attached to a carriage to move under a slab being cut with an oxy-fuel torch and with the oxygen nozzles disposed closely adjacent the lower edge of the advancing cut face of the kerf. Similarly, European Pat. No. 0 121 589 dated Oct. 25, 1987, shows a lower oxygen nozzle attached to a cutting torch for movement therewith as the torch moves over the top of and cuts the billet. The oxygen nozzle is attached to a laterally curved supply line to avoid contact with the billet. However, the outlet from the oxygen nozzle is still disposed directly beneath the cutting torch in alignment with the cutting jet during at least a portion of the cutting cycle where it is likely to be damaged or destroyed. In addition, the system requires a separate mechanism to provide oxygen nozzle movement. One embodiment shows a transverse rectangular slot at the outlet opening of, the nozzle which has a wide horizontal dimension and a narrower vertical dimension. However, the nozzle is nevertheless mounted to be disposed close to the billet and to move with the cutting torch during the cutting operation.

Published European Patent application 0 235 588, dated Sept. 9, 1987, discloses an apparatus and method in which an auxiliary horizontally disposed cutting torch is used to make a secondary scarfing cut along the lower edge of the kerf after the billet has been cut with a conventional vertically disposed cutting torch.

Thus, although the prior art recognizes the ability to oxidize and blow-away slag as it tends to form on the lower edges of the kerf in torch-cut steel shapes concurrently with the cutting process, the prior art is characterized by the use of narrow, highly directed oxygen or other gas jets which are disposed directly adjacent the advancing edge of the kerf.

SUMMARY OF THE INVENTION

In accordance with the present invention an apparatus and method for substantially eliminating the formation of slag on the lower edges of the kerf in a torch cut billet is disclosed. The invention is extremely effective, yet avoids all of the problems inherent in prior art apparatus and methods. The present invention may be utilized at high cutting speeds and consequent high volume slag formation, operates simultaneously with the gas cutting torch thereby eliminating a secondary operation, does not interefere with the cutting process, and does not remove any base metal from the cut billet or other shape being processed. Also, the apparatus is mounted in a fixed position laterally of the billet and cutting torch so that it is essentially outside the center of the hostile environment and not subject to damage and destruction from molten slag or the torch flame.

The invention includes an oxygen supply nozzle which is disposed to direct an oxygen jet along the billet surface adjacent the lower edges thereof, simultaneously with and in the same direction of movement as the cutting torch. The nozzle is mounted in a fixed position spaced laterally a substantial distance from the longitudinal center line of the billet and beyond the normal path of travel of the cutting torch. The nozzle has a uniquely shaped outlet which provides a thin flat horizontally disposed oxygen jet with the oxygen supply at a volume and pressure which provide a jet velocity sufficient to oxidize and blow away the slag over the full length of the cut, thereby avoiding the necessity of having the oxygen nozzle move along with the cutting torch such that it is maintained close to the advancing face of the cut.

Thus, the nozzle is formed with an outlet opening having a narrow vertical dimension and a wide horizontal dimension providing a flat fan-shaped pattern. The horizontal width of the nozzle opening is preferably slightly greater than the width of the kerf. The nozzle is disposed such that the oxygen jet lies in a horizontal plane generally tangent to the lower surface of the billet.

The slag preventing apparatus of the present invention may be easily adapted for use with a conventional oxy-fuel flame cutting apparatus in which a cutting torch is mounted above a billet (or cast metal strand) and disposed to direct a moving cutting jet downwardly across the billet perpendicular to its longitudinal axis. The oxygen supply nozzle is mounted laterally of the billet in a fixed position with respect thereto and may be conveniently attached directly to the cutting torch mounting assembly which is adapted to move with the billet for on-the-fly cutting. The oxygen nozzle is mounted to direct an oxygen jet in a horizontal plane along the lower edges of the kerf and in the direction of movement and simultaneously with the operation of the cutting torch. A typical cutting torch supporting assembly includes means for clamping the cutting torch to the moving billet for movement therewith, and the oxygen nozzle of the present invention may be attached directly to the clamping means and spaced to one side of the billet.

The oxygen supply nozzle used to prevent slag formation operates at a substantially lower oxygen pressure than the pressure of oxygen supplied to the oxy-fuel cutting torch with which it is used. Oxygen gas for the slag nozzle is controlled to correspond directly to the supply of oxygen to the cutting torch.

DETAILED DESCRIPTION OF THE PREFERRED EMBODIMENT

Figure 1:
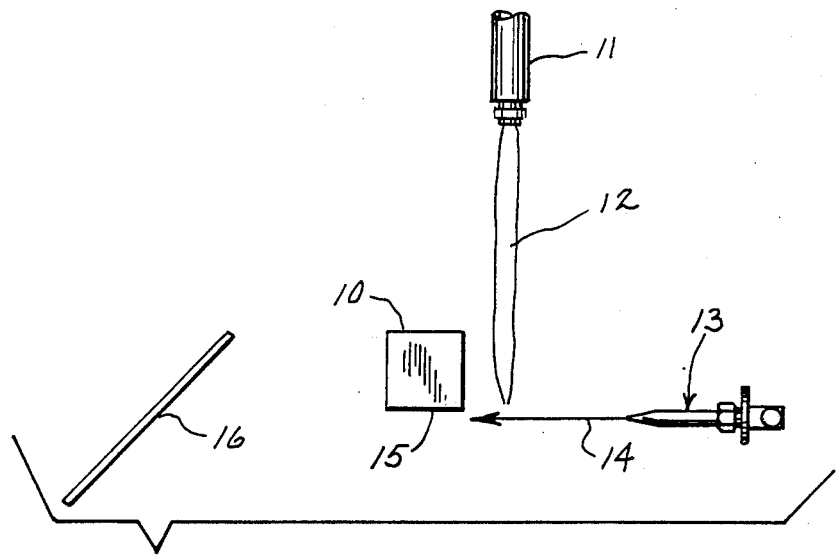
FIG. 1 is a general schematic of an oxy-fuel billet cutting system utilizing the slag eliminating nozzle apparatus of the present invention.

FIG. 1 is a very generalized schematic showing the orientation of the basic components of a billet cutting system utilizing the slag elimination nozzle of the present invention. The system is shown viewed along the longitudinal axis of the steel strand from which a billet 10 is cut. The billet is cut from a long strand or section of steel, such as a continuously cast strand which moves over a lower supporting conveying means out of the casting equipment for cutting into billets and subsequent processing. An oxy-fuel cutting torch 11 is mounted above the billet 10 for movement over the continuous strand to direct a cutting jet 12 downwardy against the metal sufficient to cut completely therethrough and form the billet section 10. The strand from which the billet is cut is typically traveling in the direction perpendicular to the plane of FIG. 1 as the cut is being made and, therefore, the cutting torch 11 is mounted for movement with the billet, as well as in the cutting direction through the billet and perpendicular to its longitudinal axis. As the billet is being cut, an oxygen nozzle 13 is mounted in a fixed position with respect to the billet and laterally to one side thereof. In particular, the nozzle is oriented to direct an oxygen jet 14 along and tangent to the underside 15 of the billet and in alignment with the kerf defining the path of the cutting torch 11.

The molten metal and slag blown from the billet by the downward force of the cutting jet 12 and by gravity drops vertically down for collection. The molten metal and slag blown from the underside 15 of the billet 10 by the horizontally acting oxygen jet 14 is deflected downwardly by a deflector shield 16 for collection below and disposal.

Figure 3:
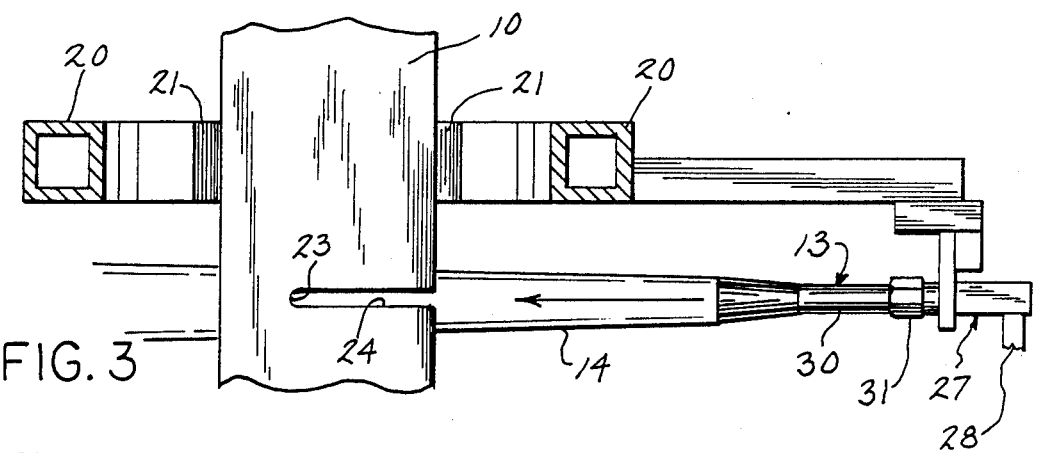
FIG. 3 is a sectional view taken on line 3—3 of FIG. 2.
Figure 2:
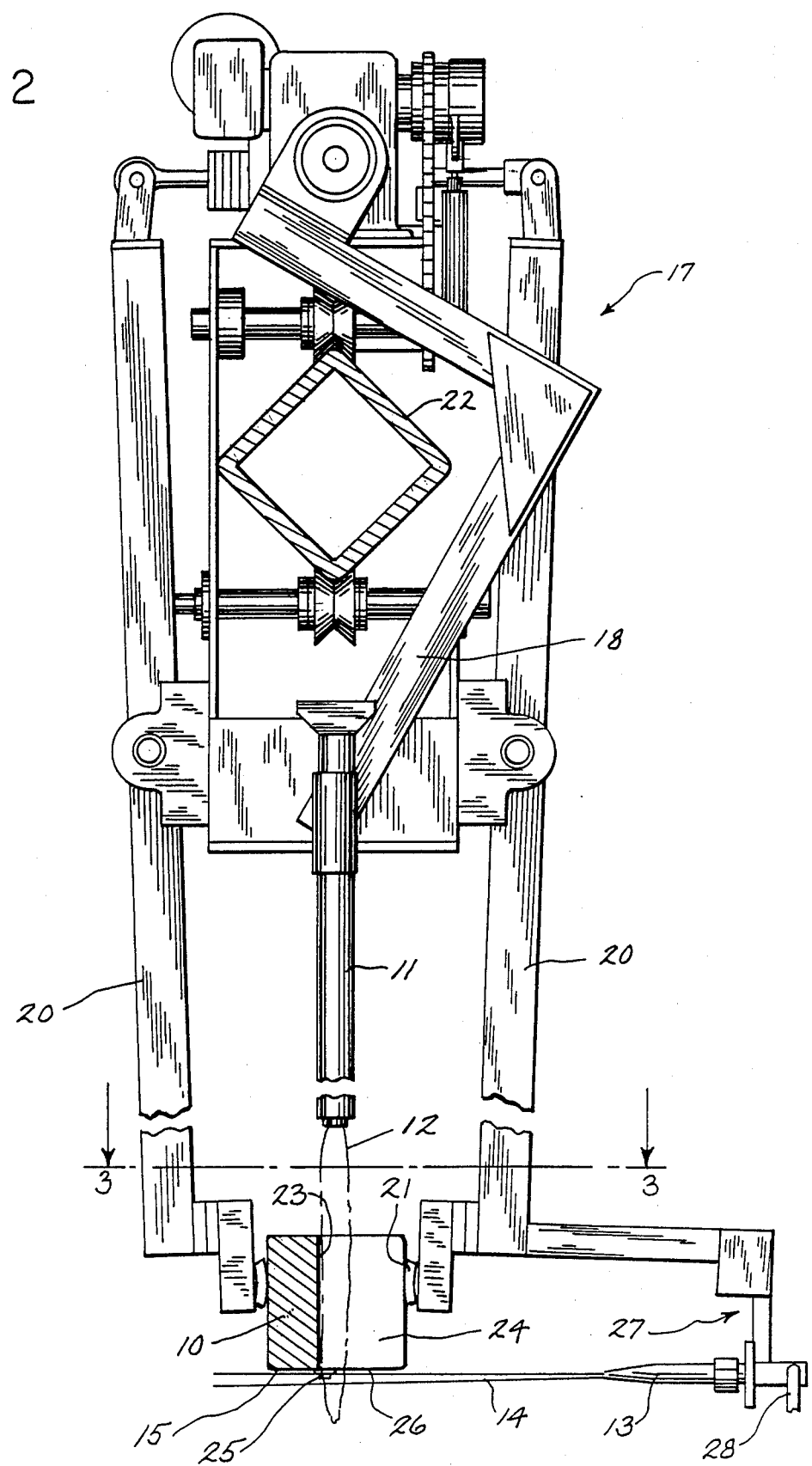
FIG. 2 is a front elevation, similar to FIG. 1, showing details of an oxy-fuel cutting apparatus and including details of the construction and attachment of the slag eliminating nozzle of the present invention.

Referring also to FIGS. 2 and 3, there is shown a conventional cutting torch carriage 17 which mounts the cutting torch 11 for movement with the advancing billet 10 and for cutting movement over the top of the billet in a direction transverse to billet movement. The carriage includes a torch support arm 18 pivotally attached to the top of the carriage to swing the cutting torch 11 through a large diameter arc defining the path of the cutting jet through the billet. The carriage 17 also includes a pair of downwardly depending clamp arms 20 which are pivotable into clamping engagement with the vertical sides of the metal strand or billet 10 by clamping pads 21 attached to the lower ends of the arms 20. The carriage 17 is mounted for movement along a stationary guide tube 22 disposed above and parallel to the longitudinal axis of the billet 10. When the clamp arms 20 are closed to clamp the billet between the clamping pads 21, the carriage will be moved by the advancing billet along the guide tube 22. Thus, the carriage and the attached cutting torch 11 are maintained in a fixed longitudinal position on the moving billet whereby the torch may be moved with its support arm 18 over the billet to apply the cutting jet 12 to sever the billet.

Referring particularly to FIG. 2, as the torch support 18 and attached cutting torch 11 move in a cutting direction from right to left, the cutting jet 12 will be caused to impinge on and cut through the billet 10, as shown. The slot or kerf 23 defined by the cut faces of the billet advances across the billet with movement of the cutting jet 12. Metal removed in the formation of the kerf 23, in the form of molten slag, flows downwardly along the cut faces 24 where a portion of the slag tends to adhere in a slag bead 25 along the lower edges 26 of the kerf 23.

A mounting assembly 27 for the oxygen nozzle 13 is attached to the lower end of one clamp arm 20 to position the oxygen nozzle offset longitudinally from the clamping pads 21, in alignment with the torch cutting path defined by the kerf 23, and spaced laterally to one side of the billet 10. The mounting assembly 27 is preferably adjustable such that, when the clamping pads 21 are in clamping engagement with the billet 10, the axis of the oxygen nozzle 13 will be disposed in or just slightly below the horizontal plane defined by the underside 15 of the billet 10. The oxygen nozzle 13 is connected by a supply line 28 to a source of oxygen gas. An oxygen jet 14 is caused to be directed from the nozzle 13 simultaneously with the operation of the cutting torch 11 directing the cutting jet 12 through the billet.

When the oxygen nozzle 13 is supplied with oxygen at an appropriate pressure and volume, the oxygen jet 14 will blow the forming slag bead 25 from the lower edges of the kerf and keep the lower surface of the billet completely slag free. The nozzle outlet opening is formed to provide an oxygen jet 14 with a narrow vertical dimension (see FIG. 2) and a wide horizontal dimension (see FIG. 3), thus providing a thin flat jet which diverges from the nozzle opening in a sort of a fan-shaped pattern. It is important that the nozzle be oriented such that the oxygen jet is generally horizontally disposed in the plane of or just slightly below the underside of the billet. In this manner, the oxygen jet which issues from a nozzle spaced some distance from one side of the billet will always impinge directly on the slag bead 25 tending to form along the lower edges of the kerf 23. Viewing the oxygen jet 14 in FIG. 3, the nozzle 13 need provide only a small divergence to the oxygen stream and, thus, a fan-shaped pattern having a small included angle is adequate. The diverging stream is necessary to assure that the oxygen stream will continue to impinge on the slag bead 25 at the farthest point of travel of the cutting torch when the cut is nearly completed. The fan-shaped pattern compensates for minor movements or inaccuracies in adjustment of the mounting assembly 27. Thus, the fan-shaped oxygen jet assures that slight horizontal misalignment of the nozzle won't cause the jet to miss the slag bead at the point most distant from the nozzle.

Figure 4:
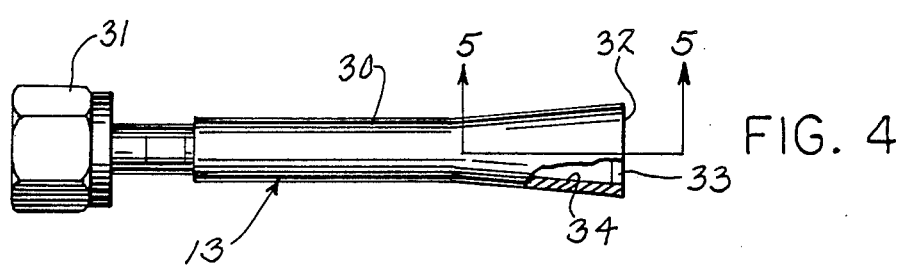
FIG. 4 is a top plan view of the oxygen supply nozzle of the present invention, partly in section.
Figure 5:
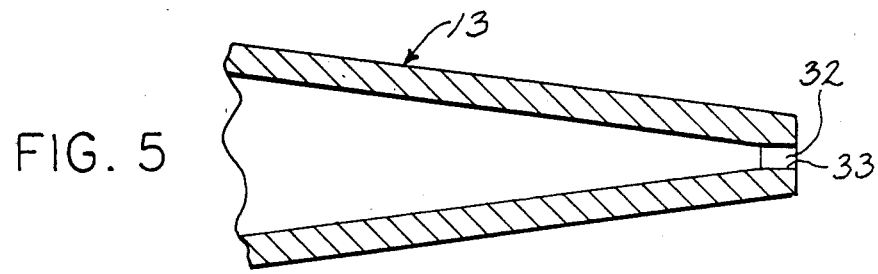
FIG. 5 is a vertical section through a portion of the nozzle taken on line 5—5 of FIG. 4.

FIGS. 4 and 5 show details of the oxygen nozzle 13 which has been found to operate satisfactorily in a stationary billet cutting assembly or when mounted on an automated oxy-fuel torch cutting assembly of the type shown and described. The nozzle 13 includes a generally cylindrical tubular body 30 attached at one end to a mounting base 31 and having an opposite end which tapers in a vertically convergent manner and horizontally divergent manner to form a nozzle opening 32 shaped to provide the thin flat oxygen jet 14 described above. In one embodiment, the narrow vertical dimension of the nozzle opening 32 is in the range of 0.085 to 0.090 inch and is defined by a pair of milled flats 33. The wide horizontal dimension of the nozzle opening 32 is 0.74 inch at the outer ends of divergent internal surfaces 34. The angle defined by the divergent surfaces 34 is approximately 8°.

In adapting the slag removing oxygen nozzle 13 to use in a conventional cutting torch system, it has been found that the nozzle works satisfactorily to cut square section billets ranging in size from 4" square to 9" square with the nozzle opening disposed in a fixed position spaced laterally approximately 6" from the edge position of the larger 9" square billet. To provide complete slag removal during the cutting process, oxygen gas was supplied to the nozzle 13 at a pressure in the range of 30–40 PSI and a volume in the range of 1900–2200 SCFH (standard cubic feet per hour). Obviously, variations in the nozzle opening dimensions, as well as the pressure and volume at which oxygen is supplied, will alter considerably the effective range over which the oxygen jet 14 may operate. However, the specific ranges noted above when used with the described nozzle will allow slag free cutting of virtually all standard billet sizes utilizing conventional oxy-fuel cutting methods. By way of comparison, the pressure of oxygen gas supplied to the cutting torch 11 is substantially greater and may be as high as 150 PSI. However, the oxygen nozzle 13 of the present invention requires a volume of oxygen gas slightly greater than that typically supplied to the cutting torch.

By mounting the nozzle opening 32 laterally offset from the side face of the billet, there is little danger that the nozzle will be damaged by molten metal or slag particles blown about by the high pressure cutting jet 12. In addition, the nozzle is spaced outside the normal maximum range of cutting torch movement such that, when the torch is disposed in its idling position prior to commencement of cutting, to the far right in FIG. 2, the cutting jet will not impinge on and burn the nozzle or its mounting assembly 27.

Round sections may also be torch cut without any significant formation of slag utilizing the apparatus and method of the present invention. Even though a round section does not provide lower kerf edges that lie in a single horizontal plane, by positioning the oxygen nozzle in a horizontal plane tangent to the bottom of a round section, virtually all of the slag, which tends to be blown downwardly and form on the lowermost edges, is oxidized and blown away. Repositioning the oxygen nozzle as the cutting torch moves is not necessary.

Various modes of carrying out the present invention are contemplated as being within the scope of the following claims particularly pointing out and distinctly claiming the subject matter which is regarded as the invention.

I claim:

1. An apparatus, for use with a billet cutting torch adapted to direct a moving cutting flame along a cutting path transversely across the billet, to substantially eliminate the formation of slag on the lower edges of the kerf defined by the cut faces of the billet, said apparatus comprising:
   an oxygen supply nozzle disposed to direct a jet of oxygen in a fixed horizontal plane generally tangent to the lower surface of the billet adjacent said lower edges simultaneously with and in the direction of movement of the cutting torch;
   means for mounting said nozzle spaced laterally of the billet and fixed with respect thereto and sufficiently outside the normal maximum range of the torch flame cutting path so as not to be destroyed or significantly damaged thereby;
   said nozzle having an outlet opening with a narrow vertical dimension and a wide horizontal dimension providing a thin flat oxygen jet which jet is fan-shaped in the horizontal plane; and,
   means for supplying oxygen to said nozzle at a volume and pressure to provide a jet having a velocity sufficient to oxidize and blow away the slag over the full length of the cut.

2. An apparatus for flame cutting billets without the formation of slag on the lower edges of the kerf, said apparatus comprising:
   a cutting torch mounted above the billet and disposed to direct a moving cutting jet across the billet in a plane perpendicular to its longitudinal axis;
   an oxygen supply nozzle mounted laterally of the billet sufficiently outside the normal maximum range of the cutting jet path so as not to be destroyed or significantly damaged thereby and fixed with respect to said billet, said nozzle having an outlet opening dimensioned and positioned to direct a jet of oxygen in a generally horizontal plane along the lower edges of the kerf in the direction of movement and simultaneously with the operation of the cutting jet, said oxygen jet having a velocity sufficient to blow the forming slag from the lower edges of the kerf over the full range of operation of the cutting jet; and
   said oxygen jet providing a vertically thin flat stream which diverges horizontally from the nozzle.

3. The apparatus as set forth in claim 2 including means for moving the billet longitudinally during cutting and wherein the cutting torch and oxygen supply nozzle are mounted for movement with the billet.

4. The apparatus as set forth in claim 3 including a cutting torch supporting assembly having clamping means for engaging the moving billet for movement therewith.

5. The apparatus as set forth in claim 4 wherein the oxygen supply nozzle is attached to said clamping means.

6. The apparatus as set forth in claim 2 comprising a source of an oxygen/fuel gas mixture according to a high pressure supply of oxygen gas for the torch, and a low pressure supply of oxygen gas for the oxygen nozzle.

7. A method for preventing the formation of slag along the lower edges of the kerf defined by the cut faces of a torch cut steel section, said method comprising:
   (1) positioning a cutting torch above the steel section;
   (2) directing a cutting jet from the torch across the section through a lateral cutting path generally perpendicular to the longitudinal axis of the section;
   (3) moving the cutting torch transversely over the section to cause the cutting jet to traverse said cutting path;
   (4) mounting an oxygen nozzle laterally spaced from the section, in a fixed position with respect thereto and sufficiently outside the normal maximum range of the cutting jet path so as not to be destroyed or significantly damaged thereby;
   (5) constructing the oxygen nozzle with an outlet opening having a narrow vertical dimension and a wide horizontal dimension shaped to create a thin flat oxygen jet which diverges from the outlet opening in a horizontal plane;
   (6) positioning the axis of the nozzle in alignment with the kerf such that the oxygen jet is disposed immediately adjacent the lower edges of the kerf; and,
   (7) supplying oxygen gas to the nozzle during operation of the cutting torch at a volume and pressure sufficient to create an oxygen jet having a velocity effective to oxidize and blow away the slag tending to form along said lower edges over the full length of the cut section.

8. The apparatus as set forth in claim 1 wherein the velocity of said oxygen jet is in the range of 1,200 to 2,000 feet per second.

9. The apparatus as set forth in claim 8 wherein said velocity is in the range of 1400 to 1600 feet per second.

10. The method as set forth in claim 7 wherein the oxygen gas is supplied at a volume and pressure sufficient to create an oxygen jet velocity in the range of 1,200 to 2,000 feet per second.

* * * * *